United States Patent [19]

Todd

[11] 4,386,337
[45] May 31, 1983

[54] LIQUID LEVEL SENSOR

[76] Inventor: John M. Todd, 18307 Burbank Blvd., #202, Tarzana, Calif. 91356

[21] Appl. No.: 156,159

[22] Filed: Jun. 3, 1980

[51] Int. Cl.³ .................................... G08B 23/00
[52] U.S. Cl. ................................. 340/59; 73/308; 200/61.2; 200/84 R; 340/624
[58] Field of Search ............... 340/59, 623, 624; 200/61.2, 84 R; 73/313, 319, 308

[56] References Cited

U.S. PATENT DOCUMENTS

| | | | |
|---|---|---|---|
| 1,246,757 | 11/1917 | Knowles | 340/59 |
| 1,323,882 | 12/1919 | Lorenz | 340/59 |
| 2,661,411 | 12/1953 | Berger | 340/623 X |
| 2,780,692 | 2/1957 | Hinojosa | 340/59 X |
| 2,804,517 | 8/1957 | Ferry | 340/623 X |
| 3,703,716 | 11/1972 | Moore | 340/59 X |
| 3,728,704 | 4/1973 | Moore | 340/59 X |
| 4,034,608 | 7/1977 | Vincent | 340/59 X |

Primary Examiner—John W. Caldwell, Sr.
Assistant Examiner—Joseph E. Nowicki
Attorney, Agent, or Firm—Nilsson, Robbins, Dalgarn, Berliner, Carson & Wurst

[57] ABSTRACT

A sensor for detection of the presence of a predetermined level of fluid in an enclosed reservoir, e.g., oil in an engine crankcase or transmission fluid reservoir, and a system for providing a remote indication of the detection of the existence of the predetermined level. The apparatus includes an electrically conductive float disposed within an encapsulator and movable responsive to the liquid level to provide an indication thereof.

14 Claims, 10 Drawing Figures

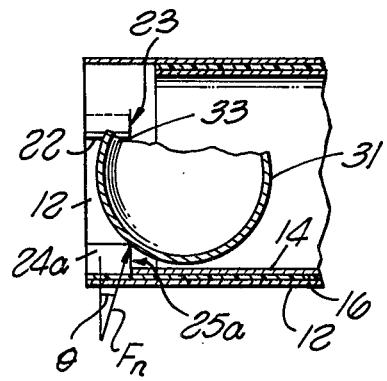
FIG. 6
FIG. 7
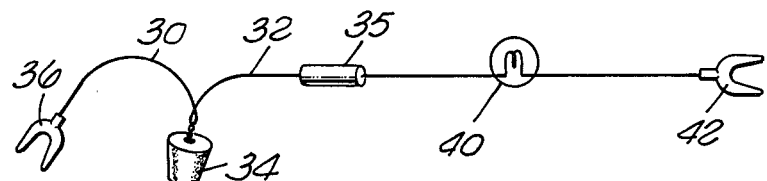
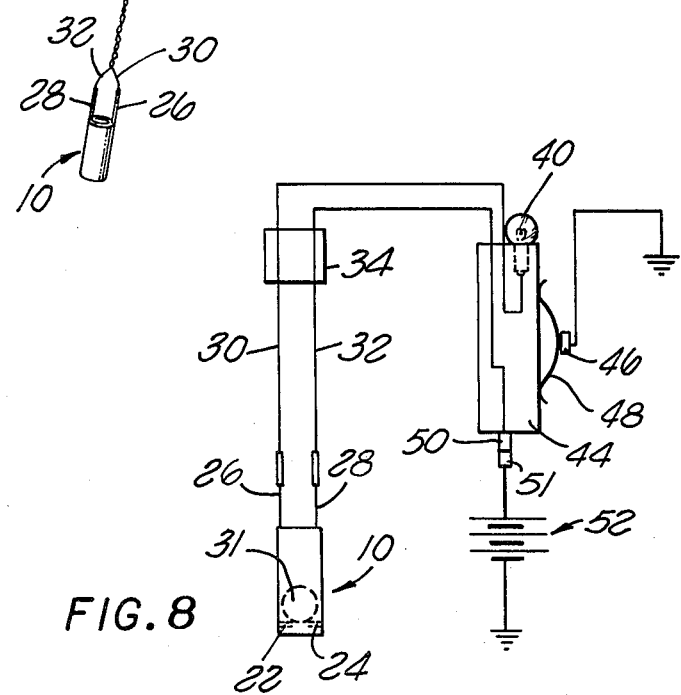
FIG. 8

LIQUID LEVEL SENSOR

BACKGROUND OF THE INVENTION

This invention relates to a novel apparatus for sensing a predetermined liquid level, e.g., a low level, in a fluid reservoir. More particularly, this invention concerns a liquid level sensor which is insertable through the tube of a conventional dipstick in order to sense a predetermined level in a fluid reservoir, e.g., the oil level in a crankcase of an internal combustion engine.

In the past it has been common to determine the level in a fluid reservoir which is entirely enclosed within an engine component housing, e.g., the oil level in a crankcase of an internal combustion engine or the fluid level and automatic transmission fluid reservoir. The dipstick is inserted through a tube extending to the reservoir and subsequently removed, with the fluid, i.e., oil, adhering to the dipstick and indicating the level within the reservoir. Such a method of determining whether the level is low or high in the fluid reservoir has the disadvantage of requiring that the operator remove the dipstick to wipe the end of the dipstick clean, and then reinsert and subsequently remove it again to read the level of oil in the reservoir. Thus no remote indication of the oil level is possible, and in the case of an automobile engine, the automobile must be stopped and the hood opened in order to gain access to the engine. Thus there is no determining the existence of a predetermined level from inside the automobile.

The problems of the prior art enumerated in the foregoing are not intended to be exhaustive, but rather are among many which tend to impair the effectiveness of previously known methods and apparatus for detecting a predetermined level in a totally-enclosed fluid reservoir, e.g., in the crankcase of an internal combustion engine or the fluid reservoir of an automatic transmission. Other noteworthy problems may also exist; however, those presented above should be sufficient to demonstrate that methods and apparatus for detecting a predetermined level in a fluid reservoir appearing in the prior art have not been altogether satisfactory, or at best overly expensive.

SUMMARY OF A PREFERRED EMBODIMENT OF THE INVENTION

Recognizing the need for an improved easily installable and calibratible apparatus for sensing the low level of a fluid in a fluid reservoir, e.g., the crankcase of an internal combustion engine or the transmission fluid reservoir of an automatic transmission, it is a general feature of the present invention to provide a novel sensor and associated remote indicator which minimizes or reduces the problems of the type previously noted. It is a more particular feature of the present invention to provide a level sensor which is universally insertable and calibratible or adjustable in a tube of any typical dipstick level measuring device and which comprises a float surrounded by an encapsulator consisting of an inner and an outer sleeve concentrically arranged with a dielectric insulating material electrically insulating the two sleeves, with each sleeve having at least one protrusion extending radially inward at one end of the encapsulator. The float is electrically conductive and electrical continuity is achieved when contact is made through the float between the concentric sleeves when it follows the descending or ascending liquid level towards the end of the encapsulator having the protrusions, to provide electrical contact from the at least one protrusion on the inner sleeve to the at least one protrusion on the outer sleeve. The sensor is of a size to fit through the dipstick tube and is suspended in the liquid reservoir by electrical contact wires, which may easily be adjusted in length as required for dipstick tubes of various lengths and for calibration of the sensor to indicate a predetermined level.

Examples of the more important features of the present invention have thus been summarized rather broadly in order that the detailed description thereof that follows may be better understood, and in order that the contribution to the art may be better appreciated. There are, of course, additional features of the invention which will be described hereafter and which will also form the subject of the appended claims. These and other features and advantages of the present invention will become more apparent with reference to the following detailed description of a preferred embodiment thereof in connection with the accompanying drawings wherein like reference numerals have been applied to like elements, in which:

BRIEF DESCRIPTION OF THE DRAWINGS

FIG. 6 shows a partially cutaway cross-sectional view of the encapsulator of the sensor of the present invention along lines 6—6 of FIG. 4, with the float shown in cross-section and partially cut away;

FIG. 7 shows a partially schematic view of the electrical circuitry connecting the sensor of the present invention to a liquid level indication light and an electrical source;

FIG. 8 shows an alternative electrical circuit for the sensor of the present invention in which the level indicating light is contained within a housing adapted to be powered when inserted into the cigarette lighter socket in an automobile dashboard;

DETAILED DESCRIPTION OF A PREFERRED EMBODIMENT

Figure 1:
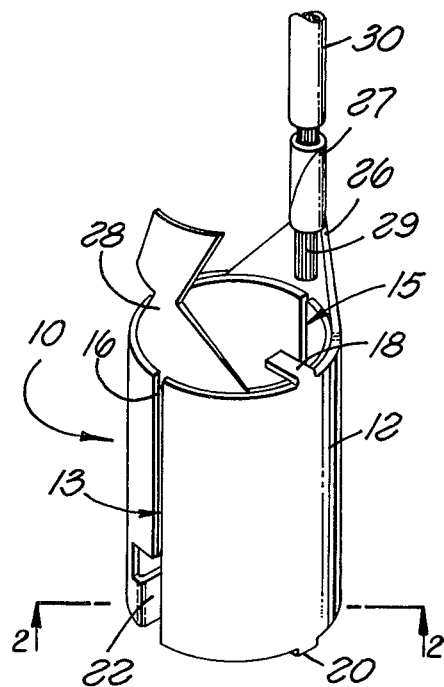
FIG. 1 shows a perspective view of one embodiment of the encapsulator of the sensor of the present invention.

Turning now to FIG. 1, the liquid level sensor of the present invention is shown to include an encapsulator 10. The encapsulator 10 has an outer sleeve 12 and an inner sleeve 14, which are concentrically arranged with the inner sleeve 14 surrounded by the outer sleeve 12 and a dielectric layer 16 interposed between the inner and outer sleeves 14, 12. The inner and outer sleeves, 14, 12 are constructed out of a flat piece of electrically conductive metal, e.g., 7030 halfhard brass, and rolled to form a generally cylindrical member, leaving a seam 13 in the outer sleeve 12 and a seam 15 in the inner sleeve 14. The sleeves, 14, 12 alternatively, may be fabricated from tubular stock. However tooling costs and the criticality of tolerances in the inner and outer diameters of the sleeves 14, 12 make roll-forming more convenient. Locking tangs 18 and 20, at, respectively, the upper and lower ends of the encapsulator 10 and integral with the outer sleeve 12 are folded across the upper and lower ends of the inner sleeve 14 in order to keep the inner and outer sleeves 14, 12 locked in position with respect to each other.

In the embodiment shown in FIG. 1, the upper locking tang 18 is of an extended length in order to retain or trap the float 31, described below, within the confines of the interior of the inner sleeve 14 when the encapsulator 10 is totally immersed in a fluid in which the float 31, described below, is buoyantly urged toward the upper locking tang 18. The underside of the upper locking tang is coated with dielectric in order to prevent electrical connection, through the float 31, between the inner and outer sleeves 14, 12 when the float 31 is at the upper end of the encapsulator. Other means of locking the outer sleeve 12 and inner sleeve 14 in position relative to each other are also useful and well known in the art, e.g., staking the outer sleeve 12 to the inner sleeve 14 with a dimple (not shown), or allowing a locking compound to capillate between the sleeves 12, 14 where the dielectric insulating layer 16 exists.

Figure 2:
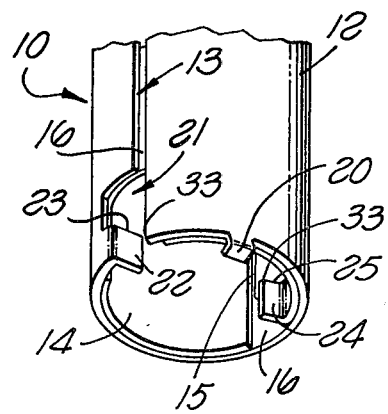
FIG. 2 depicts a perspective view of the lower end of the encapsulator shown in FIG. 1.

As may be better seen in FIG. 2, the lower end of the encapsulator 10 has two complementary radially inward protruding tangs, electrical contact tang 22, extending from the outer sleeve 12, and electrical contact tang 24 extending from the inner sleeve 14. A portion 21 of the inner sleeve 14 is cut away in the area of electrical contact tang 22 in order to allow electrical contact tang 22 to extend radially inwardly towards the center of the space defined by the interior of inner sleeve 14, without making electrical contact with the inner sleeve 14. The electrical contact tangs 22, 24 have upper surfaces, respectively 23 and 25, which are aligned in the same plane perpendicular to the longitudinal axis of the encapsulator 10. The electrical contact tangs 22, 24 may also have upper surfaces 23, 25 which slope downwardly inward to facilitate centering the float 31 for better electrical contact alignment when the encapsulator 10 is not vertically aligned in the reservoir. At the upper end of the encapsulator 10, the inner and outer sleeves 14, 12 each have a respective connector extension 28, 26. The connector extensions 28, 26 are integral with, respectively, the inner and outer sleeves, 14, 12 and are stamped in a shape which facilitates crimping. The uncrimped shape is shown by connector extension 28 in FIG. 1 and the connector extension 26 is shown crimped around the bare portion 29 of a wire lead 30 with the crimped portion 27 forming a generally cylindrical sleeve around the bare portion 29 of the wire lead 30, leaving a helical seam formed by the sides of the crimped portion 27. Other means for attaching wire leads, e.g., wire lead 30 to the connector extensions, 26, 28 are also feasible, e.g., by soldering, or tack welding or by using other suitable crimping configurations. The sloping sides of the connector extensions 26, 28, as shown in FIG. 3 minimize the risk of snagging of the encapsulator 10 when it is withdrawn through the dipstick tube.

Figure 3:
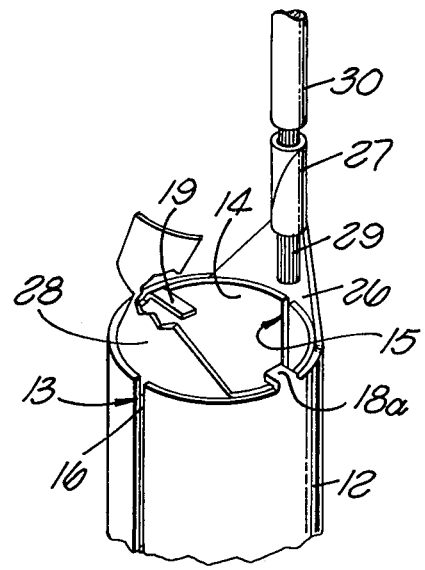
FIG. 3 shows a perspective partially cutaway view of the encapsulator of the sensor of the present invention showing an alternative method for retaining, i.e., trapping, the float within the upper end of the encapsulator.

FIG. 3 shows an alternative embodiment for the upper end of the encapsulator 10 in which a holding tang 19 extends from the inner sleeve 14 to retain or trap the float within the encapsulator, thus eliminating the requirement that this holding tang 19 be coated with dielectric on the portion of its surface which contacts the float 31, in order to prevent completing the electrical circuit when the float is at the upper end of the encapsulator 10. In this embodiment, the locking tang 18a may be of shorter length, than that of locking tang 18 shown in FIG. 1 in order to perform only the function of preventing relative movement between the inner sleeve 14 and outer sleeve 12.

Figure 4:
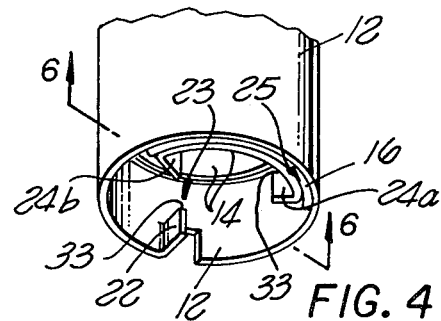
FIG. 4 shows a perspective view of the lower end of an alternative embodiment of the encapsulator of the sensor of the present invention.
Figure 5:
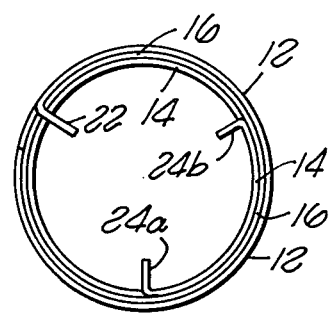
FIG. 5 shows a bottom view of the encapsulator of the sensor of the present invention shown in FIG. 4.

Turning now to FIGS. 4 and 5, an alternative embodiment of the present invention is shown in which three radially inwardly extending electrical contact tang protrusions 22, 24a and 24b are employed. Two electrical contact tang protrusions, 24a and b, are shown to extend radially inwardly from a portion of the inner sleeve 14 extending to the lower end of the encapsulator 10 with the dielectric layer 16 also extending to insulate this portion of the inner sleeve 14 from the outer sleeve 12. Electrical contact tang 22 extends radially inwardly from outer sleeve 12 as is shown in FIGS. 1 and 2. The electrical contact tangs 22, 24a and 24b are positioned to extend radially inwardly towards the center of the interior of the encapsulator 10 from points spaced generally equidistant apart on the circumference of the lower end of the outer sleeve 12.

As is shown in FIG. 6, the inner sleeve 14 does not extend all the way to the lower end of the encapsulator in the vicinity of the outer sleeve contact tang 22, but does extend to the lower end of the encapsulator in the region between the inner sleeve contact tangs 24a and b, as it must to form the tangs 24a and 24b at the proper location, with a suitable extension of the dielectric layer 16 to insulate that portion of the inner sleeve 14 from the outer sleeve 12. It is further shown in FIG. 6 that the contact points between the sleeve connectors, e.g., 24a and the outer surface of the float 31, are moved substantially away from the centerline axis of the encapsulator in order to maximize the unit pressure at the contact points due to the force exerted by the weight of the float 31 and yet insuring that the float 31 will remain within the encapsulator when the level of fluid in the reservoir drops sufficiently to allow the float to drop to the lower end of the encapsulator 10. The electrical contact tangs 22, 24a and 24b may have electrical contact points 33 where electrical contact is made with the surface of the float, which contact points 33, in this embodiment, lie in a circle concentric with the longitudinal axis of the encapsulator 10. Due to the surface tension of the fluid, e.g., oil between the outer surface of the float 31 and the inner surface of the inner sleeve 14, the size and the position of the tangs becomes crucial to insure that the float 31, which is of extremely light weight, will ride down on the contacts heavily enough to make a firm electrical contact with continuity. As the position of the contact between the tang connectors, e.g., 25a, is moved further from the centerline axis of the encapsulator 10, the angle $\theta$ decreases. Since the force along the vector $F_n$, shown in FIG. 6, is equal to the force due to the weight of the float 31 divided by the sine of the angle $\theta$, shown in FIG. 6 between the vector $F_n$ and a line perpendicular to the longitudinal axis of the encapsulator 10 and in a plane parallel to the radially inward tang 24a with the encapsulator 10 in the vertical position, decreasing angle will increase the effective force due to the weight of the float 31 at the contact point 33. It has been found that optimal results are achieved when the circle defined by the contact points 33 of the electrical contact tangs 24a, 24b and 22 of FIGS. 4-6 define a circle with a diameter greater than 0.5 and preferably equal to approximately 0.87 of the outer diameter of the float 31, or in the case of the embodiments shown in FIGS. 1-3, where the contact points 33 are separated by a distance of greater than 0.5 and preferably approximately 0.87 times the outer diameter of the float 31. As with the embodiment shown in FIGS. 1-3 the upper surfaces 23 and 25a and 25b (not shown) can be sloped downwardly inward to aid in centering the float when the encapsulator is not vertically aligned.

FIG. 7 depicts a schematic view of the electrical circuit of the present invention. The inner sleeve connector 28 of the encapsulator 10 is attached to a wire lead 32 and the outer sleeve connector 26 of the encapsulator 10 is connected to a wire lead 30. The wire leads 30, 32 are twisted and extend up through the dipstick tube to and pass through a plug 34 which seals the dipstick tube opening. The wire leads 30, 32 can be easily made to a length suitable for the length of the particular dipstick tube, and by making the hole in the plug 34 sufficiently narrow, the twisted wire leads will be frictionally bound by the plug 34, but can be forced to slide in the hole to adjust the length of the wire leads 30, 32 from the plug 34 to the reservoir for purposes of calibration of the sensor to a predetermined level in the reservoir. The wire leads 30, 32 are selected to be of a sufficient gauge to give support to the encapsulator 10 and to have sufficient flexibility to allow the encapsulator 10 to extend vertically downward towards the level in the reservoir once the encapsulator 10 is inserted down the dipstick tube far enough to clear the terminal end of the dipstick tube, though depending on the shape of the reservoir, the position of the terminal end of the dipstick tube and the level to be indicated in the reservoir, it is not always necessary for the encapsulator 10 to extend beyond the terminal end. The wire lead 30 is connected to a lug 36 which is grounded to the chassis of the vehicle. The wire lead 32 is connected through a disconnect plug 35 to an indicator lamp 40, with the indicator lamp 40 being connected through lug 42 to a suitable electrical source, for example, the starter circuit of the vehicle. Thus when the starter circuit is activated by turning the key of the automobile, the indicator lamp 40 will be supplied with current whenever the liquid level in the reservoir is sufficiently low for the float 31 to make an electrical contact between the inner and outer sleeves 12, 14 by touching the contact points 33 on electrical contact tangs 22, 24 in FIG. 1 and 22, 24a and/or 24b in FIG. 4.

FIG. 8 shows an alternative embodiment for the liquid level sensor of the present invention in which the indicator lamp 40 is housed in a cigarette lighter insert 44 having a spring contact 48 and a power contact 50. The spring contact 48 makes electrical connection with a grounded contact 46 in the wall of the cigarette lighter housing in the dashboard of the car. A power contact 50 makes electrical connection with a contact 51 in the end of the cigarette lighter housing in the dashboard, which power contact 51 is connected to a suitable power supply, for example, the battery 52 of a vehicle. Thus, when the float 31 makes electrical contact between the electrical contact tangs 22, 24 in FIG. 1 and 22, 24a and/or 24b in FIG. 4, an electrical circuit is completed from the battery 52 through power contact 51, the inner and outer sleeves 12, 14 of the encapsulator 10, the indicator light 40, and ground, through spring contact 48 and grounded contact 46.

Figure 9:
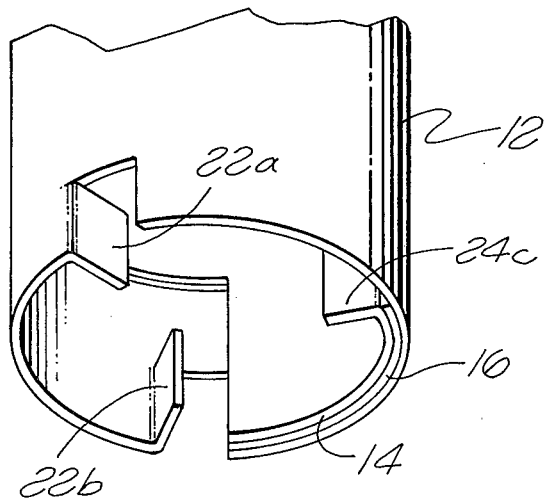
FIG. 9 shows a perspective view of the lower end of an alternative embodiment of the encapsulator of the sensor of the present invention.
Figure 10:
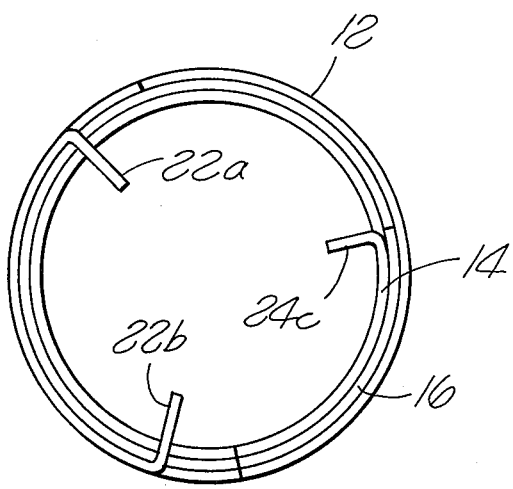
FIG. 10 shows a bottom view of the encapsulator of the sensor of the present invention shown in FIG. 9.

FIGS. 9 and 10 illustrate an additional alternative embodiment wherein the tangs 22a and 22b extend inwardly from the outer sleeve 12 while the tang 24c extends inwardly from the inner sleeve 14.

SUMMARY OF THE ADVANTAGES AND SCOPE OF THE INVENTION

It will be appreciated that in constructing a liquid level sensor according to the present invention, certain significant advantages are provided. In particular, a liquid level sensor is provided which is insertable through the dip stick tube opening already provided as an access to the liquid reservoir, e.g., the oil crankcase of an automobile engine or the transmission fluid reservoir of an automatic transmission. The sensor provides an accurate and positive remote indication of when the level of liquid in the reservoir is at or below a selected level determined by calibration of the position of the sensor within the fluid reservoir. It is particularly important to have such a remote indication in the case of, e.g., the oil level in the crankcase or the fluid level in the transmission in order to insure proper operation of both the automobile engine and the automatic transmission and to guard against damage to the components of each. With the apparatus of the present invention, the remote indicator lamp may be conveniently placed, e.g., on the dashboard of the vehicle, to provide an indication of a low level without the need to have the vehicle stationary, open the hood and use the typical dipstick.

Further, the circumferential angular position and radial inward extension of the electrical contact tangs of the present invention provide for a distribution and location of contact points, in both of the embodiments of the present invention, which insure positive electrical contact between the tangs and the electrically conductive float, even considering the necessary extreme light weight of the electrically conductive float. In addition, the connectors extending longitudinally upward from the inner and outer sleeves and tapering outwardly from generally the upper to the lower end of the connectors, so that the connectors extend around a substantial portion of the respective inner and outer sleeves, along with the connection of the wire leads to the internally facing surfaces of the contactors, insures that the sensor of the present invention will not hang up on the lower end of the tube wall of the dipstick tube when it is desired to remove the sensor from the fluid reservoir, in order to recalibrate the predetermined level, or repair or replace the encapsulator.

The encapsulator, having an open upper and lower end also provides for a self-flushing which will maintain the contact points of the radially inwardly extending electrical contact tangs free of debris which may be present in the fluid in the reservoir. Also, the open upper end of the encapsulator provides a vent on the upper side of the float above the highest excursion point of the float so that any tendency to form a vacuum seal due to the viscosity of the oil between the outer surface of the float and the inner surface of the inner sleeve, which would prevent the light weight float from dropping, is eliminated.

Calibration of the liquid level sensor of the present invention to a predetermined level in a reservoir is very simple. Calibration of the system is accomplished by determining the liquid level in a remote reservoir to be monitored and installing the sensor to calibrate it to the known level. In the crankcase of an automobile engine, e.g., the level can first be determined by use of a conventional dipstick. If, e.g., it is desired to calibrate the sensor to the "add one quart" line on the dipstick, oil is added or removed until the dipstick indicates the level to be at the "add one quart" line. Electrical power is then supplied to the sensor and it is inserted into the dipstick tube. The indicator lamp, for low level indication, should be on until the lower end of the encapsulator is further lowered until immersed in the reservoir fluid sufficiently for the float to be buoyantly urged out of electrical contact with at least the contact tang on the sleeve containing only one tang or both tangs on the sleeve containing two tangs (in the embodiment wherein there is more than one tang on one or both sleeves). The encapsulator of the present invention has a sensitivity range of about ±1/16 inch from the calibrated level as indicated by the dipstick. The encapsulator is then withdrawn slightly, causing the indicator lamp to illuminate. This is repeated several times, immersing and withdrawing to develop a feel for the sensor encapsulator being just at the point where the transition occurs between illumination and extinction of the indicator lamp, and with the lamp illuminated. By then adding a small amount of oil, e.g., ⅛ quart, the lamp should extinguish and the sensor has been calibrated to the desired low level setting. The frictional engagement of the wire leads by the enclosure plug, or the use of any other suitable means, will then hold the wire leads in position so that the position, in turn, of the encapsulator will remain at the calibrated level. In some reservoirs, e.g., the crankcase, the level will change significantly from the condition when the engine is running and the condition when the engine is stopped. Thus if the level desired to be sensed is an engine-running level, calibration must occur when the engine is running, and vice-versa for sensing an engine-stopped level.

The foregoing description of the invention has been directed to a particular preferred embodiment in accordance with the requirements of the patent statutes and for purposes of explanation and illustration. It will be apparent, however, to those of ordinary skill in the art that many modifications and changes in both the apparatus and method of the present invention may be made without departing from the scope and spirit of the invention. For example, the electrical contact portion of the present invention could be positioned at the upper end of the encapsulator with a holding tang or tangs at the lower end for purposes of measuring a high fluid level rather than a low fluid level. Thus, the exceeding of the predetermined level as used in the specification and claims of the present invention is meant to refer in the case of a low level detector, to the level being at or below the predetermined low level and for a high level detector, to the level being at or above the predetermined high level. It will further be understood that the specific size and shape of both the encapsulator and the float may be modified so long as the criteria according to the present invention are met. The encapsulator must fit within the dipstick tube of, e.g., the crankcase of the engine or the transmission fluid reservoir of the automatic transmission, in which it is desired to monitor the fluid level. The float must be buoyant in the fluid desired to be monitored and have sufficient clearance, between the outer surface of the float and the inner surface of the inner sleeve of the encapsulator, to insure that the surface tension, due to viscosity of the fluid, between the float (having a particular weight necessary for a float of such size and shape to be buoyant in the particular fluid) and the encapsulator inner sleeve will not prevent movement of the float. A generally cylindrical shape for the encapsulator of the present invention has been selected due to the cylindrical shape of dip stick tubes presently on the market. Similarly, the float is shown to be a hollow sphere because this is the most efficient buoyant shape which would fit within a generally cylindrical tubular encapsulator. However, for a square dipstick tube, the encapsulator and float may be conveniently selected to be of a square tubular shape, with the float being of a hollow enclosed square or rectangular box shape. In addition, the exact electrical connection between the power source and the indicator lamp is not crucial, though preferably the outer sleeve is electrically grounded to prevent grounding of the encapsulator by the dipstick tube, so long as the encapsulator acts as a switch in the electrical circuit, closing when a predetermined level exists or is exceeded in the reservoir. It will be understood by those skilled in the art that many possible electrical circuits could be used. For example, it may be desirable to only intermittently energize the circuit containing the encapsulator, even when the ignition switch is in the "ON" or "AUXILIARY" position. Thus an additional pushbutton or toggle switch may be included which will allow for intermittent energizing of the sensor circuit to self test or to see if the indicator light energizes, indicating the presence of or an excess of the predetermined level. In addition a plurality of such sensors, in different remote reservoirs, e.g., the crankcase, transmission fluid reservoir or power steering fluid reservoir, may be intermittently connected through a multiple position switch, e.g. a barrel switch, to the indicator light and power source.

It will be further apparent that the invention may also be utilized with suitable modifications within the state of the art. These and other modifications of the invention will be apparent to those skilled in the art. It is applicant's intention in the following claims to cover all such equivalent modifications or variations as fall within the true spirit and scope of the invention.

What is claimed is:

1. A liquid level sensor for detecting the existence of or excess of a predetermined level of a liquid in a reservoir, having one access opening to the reservoir through a dipstick tube, comprising:
    an encapsulator having an inner sleeve and an outer sleeve surrounding the inner sleeve and electrically insulated from the inner sleeve, and being of a size sufficiently small to be inserted into and pass through the dipstick tube;
    at least one inner sleeve contact tang protruding radially inward from the inner sleeve;
    at least one outer sleeve contact tang protruding radially inward from the outer sleeve without making electrical contact with the inner sleeve;
    an electrically conductive float contained within the space defined by the interior of the inner sleeve and freely movable within the interior of the inner sleeve;
    a first wire lead electrically connected to one of the inner sleeve and the outer sleeve; and,
    a second wire lead electrically connected to the other of the inner and the outer sleeve; the first and second wire leads passing through the dipstick tube and electrically connecting, respectively, to an electrically-grounded point and to an indicator lamp which lamp is electrically connected to a source of electrical power.

2. The level sensor of claim 1 wherein the at least one inner sleeve contact tang and the at least one outer sleeve contact tang further comprise:
- a first and a second inner sleeve contact tang; and
- an outer sleeve contact tang.

3. The level sensor of claim 1 wherein the at least one inner sleeve contact tang and the at least one outer sleeve contact tang further comprise:
- a first and a second outer sleeve contact tang; and,
- an inner sleeve contact tang.

4. The level sensor of claim 1 wherein the at least one inner sleeve contact tang and the at least one outer sleeve contact tang further comprise:
- an inner sleeve contact tang; and
- an outer sleeve contact tang.

5. The liquid level sensor of claim 2 wherein each contact tang has a contact point at which electrical contact is made with the float and each contact point lies on the circumference of a circle, which circle lies in a plane orthogonal to the longitudinal axis of the encapsulator and is concentric with the longitudinal axis of the encapsulator.

6. The liquid level sensor of claim 3 wherein each contact tang has a contact point at which electrical contact is made with the float and each contact point lies on the circumference of a circle, which circle lies in a plane orthogonal to the longitudinal axis of the encapsulator and is concentric with the longitudinal axis of the encapsulator.

7. The liquid level sensor of claim 5 wherein each contact tang has a contact point at which electrical contact is made with the float and each contact point lies on a line intersecting the longitudinal axis of the encapsulator.

8. The liquid level sensor of claims 5 or 6 wherein the float has an outer diameter and the diameter of the circle is more than 0.5 the outer diameter of the float.

9. The liquid level sensor of claim 7 wherein the float has an outer diameter and the distance between each contact point is more than 0.5 the outer diameter of the float.

10. The liquid level sensor of claim 1 wherein the float is a hollow ball made of electrically conductive material.

11. The liquid level sensor of claim 10 wherein the float is made of aluminum.

12. The liquid level sensor of claim 1 wherein the indicator lamp is contained within a housing insertable into an automobile dashboard cigarette lighter socket;
- the indicator lamp being electrically connected to ground through a grounded contact in the cigarette lighter socket and electrically connected to one of the first and second lead wires;
- the other of the first and second wire leads being connected to a source of electrical power.

13. The liquid level sensor of claim 1, further comprising:
- a connector extension extending longitudinally from one end of both of inner and outer sleeves; and,
- each connector extension having a pair of opposed edges which taper to a wire lead-attaching region.

14. The liquid level sensor of claim 13, further comprising:
- each connector being shaped, in the wire lead-attaching region, so that when the wire lead-attaching region is bent about the wire lead, the wire lead-attaching region forms a cylindrical wire lead enclosing sleeve about the wire lead.

* * * * *